US012811991B2

(12) United States Patent
Tamayo et al.

(10) Patent No.: US 12,811,991 B2
(45) Date of Patent: Nov. 24, 2026

(54) COLLABORATIVE WEBSITE BROWSING

(71) Applicant: Capital One Services, LLC, McLean, VA (US)

(72) Inventors: Bryan Tamayo, Allen, TX (US); William Merkel, Garland, TX (US)

(73) Assignee: Capital One Services, LLC, McLean, VA (US)

( * ) Notice: Subject to any disclaimer, the term of this patent is extended or adjusted under 35 U.S.C. 154(b) by 100 days.

(21) Appl. No.: 18/968,508

(22) Filed: Dec. 4, 2024

(65) Prior Publication Data

US 2026/0156166 A1 Jun. 4, 2026

(51) Int. Cl.
*H04L 65/401* (2022.01)
*G06F 9/54* (2006.01)
*G06F 16/955* (2019.01)

(52) U.S. Cl.
CPC ............ *H04L 65/4015* (2013.01); *G06F 9/54* (2013.01); *G06F 16/9558* (2019.01)

(58) Field of Classification Search
CPC ..... H04L 65/4015; G06F 16/9558; G06F 9/54
See application file for complete search history.

(56) References Cited

U.S. PATENT DOCUMENTS 8,171,123 B2 * 5/2012 Takeda .................. H04L 47/521 709/224
10,002,337 B2 6/2018 Siddique et al.
10,126,927 B1 * 11/2018 Fieldman ............ G06F 3/04847
10,296,962 B2 5/2019 Abraham et al.
10,872,322 B2 * 12/2020 Siddique ................ G06Q 20/12
11,405,433 B1 * 8/2022 Vaid ...................... G06F 16/954
12,182,502 B1 * 12/2024 Nakajima ............. G06F 40/169
2011/0289157 A1 * 11/2011 Pirnazar .................. H04L 51/52 709/227
2014/0237490 A1 * 8/2014 Yoo ....................... H04L 65/403 719/329
2018/0174122 A1 * 6/2018 Mattingly .............. G06Q 20/12
2020/0134002 A1 * 4/2020 Tung ....................... G06F 21/53

(Continued)

OTHER PUBLICATIONS

Nicole Herskowitz, "Announcing new Copilot in Microsoft Teams enhancements," Microsoft 365 Blog (Mar. 26, 2024), 8 pages, retrieved from https://www.microsoft.com/en-us/microsoft-365/blog/2024/03/26/ai-powered-collaboration-with-microsoft-teams.

(Continued)

*Primary Examiner* — Frantz B Jean
(74) *Attorney, Agent, or Firm* — Harrity & Harrity, LLP

(57) ABSTRACT

In some implementations, a collaboration system may receive, from a first user device, an instruction to initiate a collaborative session, and may receive, from a second user device, a request to join the collaborative session. The collaboration system may transmit, to the user devices, instructions for a user interface (UI) with a first panel with a first copy of a website controlled by the first user device and a second panel with a second copy of the website controlled by the second user device. The collaboration system may receive an indication of a first change in state and may transmit, to the user devices, instructions to update the UI based on the first change in state. The collaboration system may receive an indication of a second change in state and may transmit, to the user devices, instructions to update the UI based on the second change in state.

20 Claims, 11 Drawing Sheets

(56) References Cited

U.S. PATENT DOCUMENTS

| | | | | |
|---|---|---|---|---|
| 2021/0216969 | A1* | 7/2021 | Gray | G06Q 10/103 |
| 2022/0164403 | A1* | 5/2022 | Chandra | G06F 16/9535 |
| 2023/0004939 | A1* | 1/2023 | Quartiero | G06Q 10/103 |
| 2025/0310395 | A1* | 10/2025 | Balashov | H04N 7/15 |

OTHER PUBLICATIONS

"Requesting or giving remote control," Zoom Support (Feb. 23, 2024), 2 pages, retrieved from https://support.zoom.com/hc/en/article?id=zm_kb&sysparm_article=KB0065790.

"Sharing your screen or desktop on Zoom," Zoom Support (Mar. 6, 2024), 4 pages, retrieved from https://support.zoom.com/hc/en/article?id=zm_kb&sysparm_article=KB0060596.

* cited by examiner

COLLABORATIVE WEBSITE BROWSING

BACKGROUND

Users of computer devices may collaborate remotely over a network (e.g., the Internet and/or an intranet). Many collaborative tools, such as videoconference software, are difficult to use and consume significant amounts of computing resources.

SUMMARY

Some implementations described herein relate to a system for facilitating collaboration on a website. The system may include one or more memories and one or more processors communicatively coupled to the one or more memories. The one or more processors may be configured to receive, from a first user device, an indication of the website and an instruction to initiate a collaborative session. The one or more processors may be configured to receive, from a second user device, a request to join the collaborative session. The one or more processors may be configured to transmit, to the first user device and the second user device, instructions for a user interface (UI), wherein the UI has a first panel with a first copy of the website controlled by the first user device, a second panel with a second copy of the website controlled by the second user device, and a chat box overlaid controlled by both the first user device and the second user device. The one or more processors may be configured to receive, from the first user device, an indication of a first change in state associated with the first copy of the website. The one or more processors may be configured to transmit, to the first user device and the second user device, instructions to update the UI based on the first change in state. The one or more processors may be configured to receive, from the second user device, an indication of a second change in state associated with the second copy of the website. The one or more processors may be configured to transmit, to the first user device and the second user device, instructions to update the UI based on the second change in state. The one or more processors may be configured to receive, from the first user device, first input into the chat box. The one or more processors may be configured to transmit, to the first user device and the second user device, the first input for display in the chat box. The one or more processors may be configured to receive, from the second user device, second input into the chat box. The one or more processors may be configured to transmit, to the first user device and the second user device, the second input for display in the chat box.

Some implementations described herein relate to a method of facilitating collaboration on a website. The method may include receiving, at a collaboration system and from a first user device, an indication of the website and an instruction to initiate a collaborative session. The method may include receiving, at the collaboration system and from a second user device, a request to join the collaborative session. The method may include transmitting, to the first user device and the second user device, instructions for a UI, wherein the UI has a first panel with a first copy of the website controlled by the first user device, a second panel with a second copy of the website controlled by the second user device, and a chat box overlayed controlled by both the first user device and the second user device. The method may include receiving, at the collaboration system and from the first user device, an indication of a first change in state associated with the first copy of the website. The method may include transmitting, to the first user device and the second user device, instructions to update the UI based on the first change in state. The method may include receiving, at the collaboration system and from the second user device, an indication of a second change in state associated with the second copy of the website. The method may include transmitting, to the first user device and the second user device, instructions to update the UI based on the second change in state.

Some implementations described herein relate to a non-transitory computer-readable medium that stores a set of instructions for facilitating collaboration on a website. The set of instructions, when executed by one or more processors of a device, may cause the device to transmit, to a collaboration system, an indication of the website and an instruction to initiate a collaborative session. The set of instructions, when executed by one or more processors of the device, may cause the device to transmit, to a user device, an invitation to the collaborative session. The set of instructions, when executed by one or more processors of the device, may cause the device to receive, from the collaboration system, instructions for a UI, wherein the UI has a first panel with a first copy of the website controlled by the device, a second panel with a second copy of the website controlled by the user device, and a chat box overlayed controlled by both the device and the user device. The set of instructions, when executed by one or more processors of the device, may cause the device to transmit, to the collaboration system, an indication of a first change in state associated with the first copy of the website. The set of instructions, when executed by one or more processors of the device, may cause the device to receive, from the collaboration system and in response to the indication of the first change in state, instructions to update the UI based on the first change in state. The set of instructions, when executed by one or more processors of the device, may cause the device to receive, from the collaboration system, instructions to update the UI based on a second change in state associated with the user device.

DETAILED DESCRIPTION

The following detailed description of example implementations refers to the accompanying drawings. The same reference numbers in different drawings may identify the same or similar elements.

Users of computer devices may collaborate remotely over a network (e.g., the Internet and/or an intranet). For example, multiple users may start a video call using Microsoft® Teams, Zoom®, or another type of videoconference software. However, videoconference software may be difficult to use for collaboration. Additionally, videoconference software is generally resource-heavy, especially when using collaborative features, such as screen sharing and instant messaging, in addition to video calling.

Some implementations described herein enable a collaboration system to generate a UI including copies of a website for each participant in a collaborative session. The collaboration system may update the UI as each participant navigates through that participant's copy of the website (e.g., using application programming interfaces (APIs), such as representational state transfer (REST) APIs, provisioned for each participant). As a result, the collaboration system may enable collaboration on the website with significantly fewer computing resources than videoconference software.

FIGS. 1A-1G are diagrams of an example 100 associated with collaborative website browsing. As shown in FIGS. 1A-1G, example 100 includes a collaboration system, a first user device, a second user device, and a web host. These devices are described in more detail in connection with FIGS. 3 and 4.

Figure 1A:
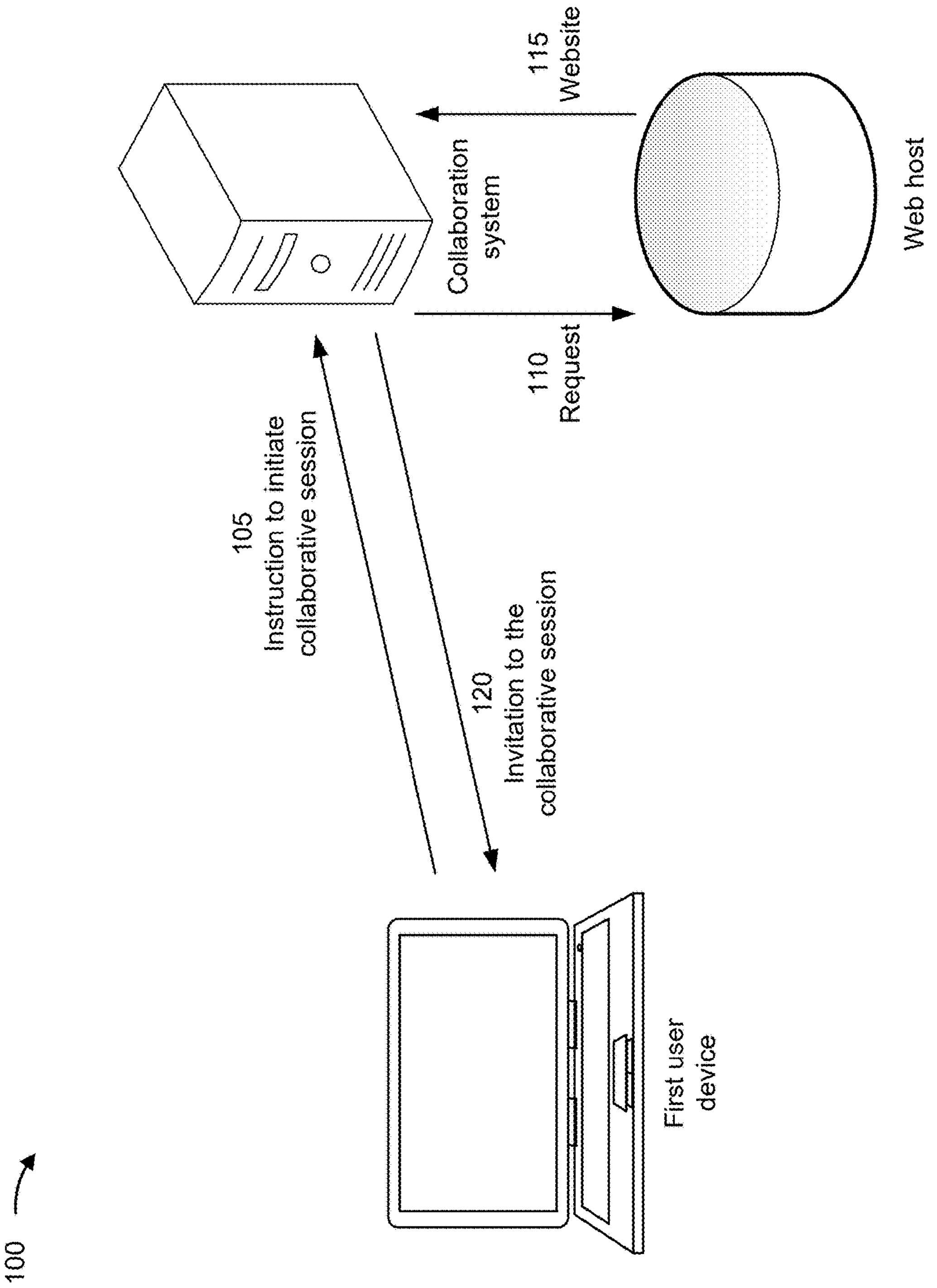
FIGS. 1A-1G are diagrams of an example implementation relating to collaborative website browsing, in accordance with some embodiments of the present disclosure.

As shown in FIG. 1A and by reference number 105, the first user device may transmit, and the collaboration system may receive, an instruction to initiate a collaborative session. The instruction may include a hypertext transfer protocol (HTTP) message, a file transfer protocol (FTP) message, and/or an API call, among other examples.

In one example, a first user associated with the first user device may provide input (e.g., via an input component of the first user device) that triggers the first user device to transmit the instruction. In some implementations, the first user may interact with a UI to provide the input. For example, a web browser (or another type of application) executed by the first user device may navigate to a website controlled by (or at least associated with) the collaboration system. Accordingly, the first user device may output a UI (e.g., via an output component of the first user device) representing the website, and the first user may interact with the UI to provide the input. Alternatively, the first user may provide text input (e.g., via a command line or a shell, among other examples) to trigger the first user device to transmit the instruction.

In some implementations, the first user device may include a set of credentials with the instruction. The set of credentials may include a username and password, a passkey, a certificate, a signature, a private key, and/or biometric information, among other examples. Therefore, the collaboration system may validate the set of credentials (e.g., before processing the instruction). In some implementations, the first user device may transmit the set of credentials separately from the instruction. For example, the first user device may transmit the set of credentials initially, and the collaboration system may accept the instruction from the first user device in response to validating the set of credentials. In another example, the collaboration system may prompt the first user device in response to the instruction, and the first user device may transmit the set of credentials in response to the prompt. Accordingly, the collaboration system may validate the set of credentials and may process the instruction in response to validating the set of credentials.

In some implementations, the first user device may additionally transmit, and the collaboration system may additionally receive, an indication of a website. For example, the indication may include a web address associated with the website, an Internet protocol (IP) address associated with the website, a machine name of the web host for the website, and/or a medium access control (MAC) address associated with the web host for the website. The first user device may transmit, and the collaboration system may receive, the indication of the website in a same message as the instruction to initiate a collaborative session. Alternatively, the first user device may transmit, and the collaboration system may receive, the indication of the website in a separate message from a message including the instruction to initiate a collaborative session. For example, the first user device may transmit the instruction initially, the collaboration system may prompt the first user device in response to the instruction, and the first user device may transmit the indication in response to the prompt. The input from the first user, as described above, may include the indication of the website. For example, the first user may input the indication into a text box or another type of UI element.

In some implementations, the first user device may additionally transmit, and the collaboration system may additionally receive, a setting associated with the collaborative session. For example, the setting may include an instruction to disallow collaborators access to a portion of the website (e.g., a favorites list and/or another portion). The first user device may transmit, and the collaboration system may receive, the setting in a same message as the instruction to initiate a collaborative session. Alternatively, the first user device may transmit, and the collaboration system may receive, the setting in a separate message from a message including the instruction to initiate a collaborative session. For example, the first user device may transmit the instruction initially, the collaboration system may prompt the first user device in response to the instruction, and the first user device may transmit the setting in response to the prompt. The input from the first user, as described above, may indicate the setting. For example, the first user may use a check box, a ratio box, or another type of UI element to indicate the setting.

As shown by reference number 110, the collaboration system may transmit, and the web host may receive, a request for the website. For example, the request may include an HTTP request, an FTP request, and/or an API call. The collaboration system may include the indication of the website, from the first user device, in the request. Additionally, or alternatively, the collaboration system may resolve the indication of the website (e.g., using a domain name service (DNS)) to obtain an indication of the web host (e.g., a machine name, an IP address, a MAC address, and/or another type of identifier associated with the web host). Accordingly, the collaboration system may transmit, and the web host may receive, the request based on the indication of the website.

As shown by reference number 115, the web host may transmit, and the collaboration system may receive, a copy of the website. For example, the web host may transmit, and the collaboration system may receive, a webpage (e.g., a hypertext markup language (HTML) file, optionally with one or more supporting cascading style sheets (CSS)), optionally with supporting media (e.g., image files, video files, and/or audio files, among other examples) and/or supporting scripts (e.g., JavaScript® files, among other examples).

Concurrently with (or before or after) retrieval of the website, as described above, the collaboration system may transmit, and the first user device may receive, an invitation to the collaborative session, as shown by reference number 120. The invitation may include a link (e.g., a hyperlink), a quick response (QR) code (e.g., encoding the link), and/or a meeting identifier (e.g., an alphanumeric code associated with the collaborative session, optionally with a password or another type of secret used to access the collaborative session).

Figure 1B:
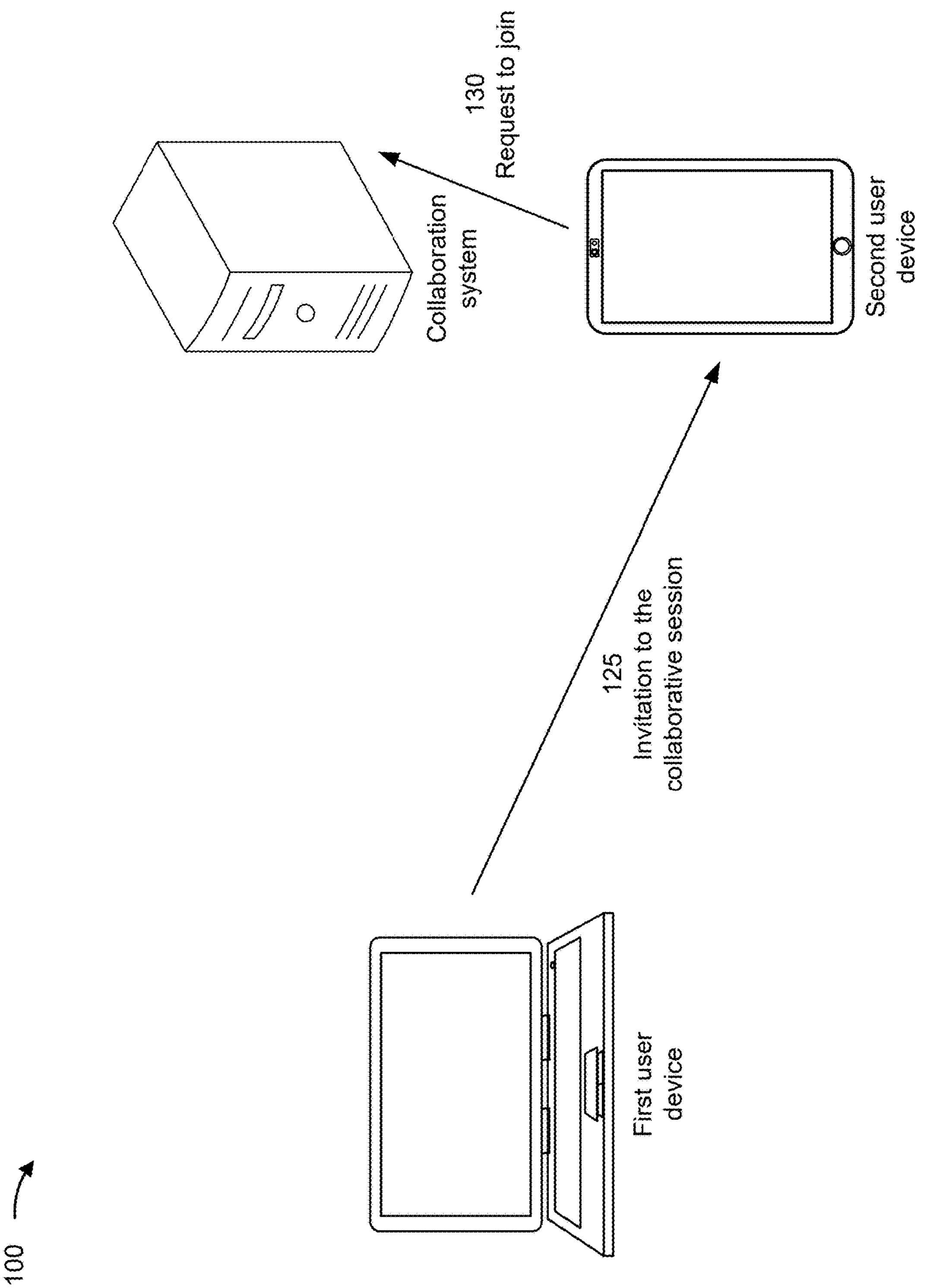

As shown by in FIG. 1B and by reference number 125, the first user device may transmit, and the second user device may receive, the invitation to the collaborative session. For example, the first user device may transmit, and the second user device may receive, an email message or a text message encapsulating the invitation. Accordingly, the first user (associated with the first user device) may invite a second user (associated with the second user device) to join the collaborative session.

Although the example 100 is described in connection with the first user device transmitting the invitation, other examples may include the collaboration system transmitting the invitation. For example, the first user device may transmit, and the collaboration system may receive, an indication of the second user device to invite, whether with the instruction to initiate a collaborative session or separately therefrom. Accordingly, the collaboration system may transmit the invitation directly to the second user device in addition to, or in lieu of, transmitting the invitation to the first user device.

As shown by reference number 130, the second user device may transmit, and the collaboration system may receive, a request to join the collaborative session. The request may include an HTTP request, an FTP request, and/or an API call. In one example, the second user device may use the link (or the link after being decoded from a QR code) to transmit the request. The second user may provide input that triggers the second user device to resolve the link, which results in an API call that functions as the request. In another example, the second user device may navigate (e.g., using a web browser or another type of application executed by the second user device) to a website controlled by (or at least associated with the collaboration system). Accordingly, the second user may input the meeting identifier (e.g., into a text box of the website) and may interact with the website to trigger the second user device to transmit the request.

Figure 1C:
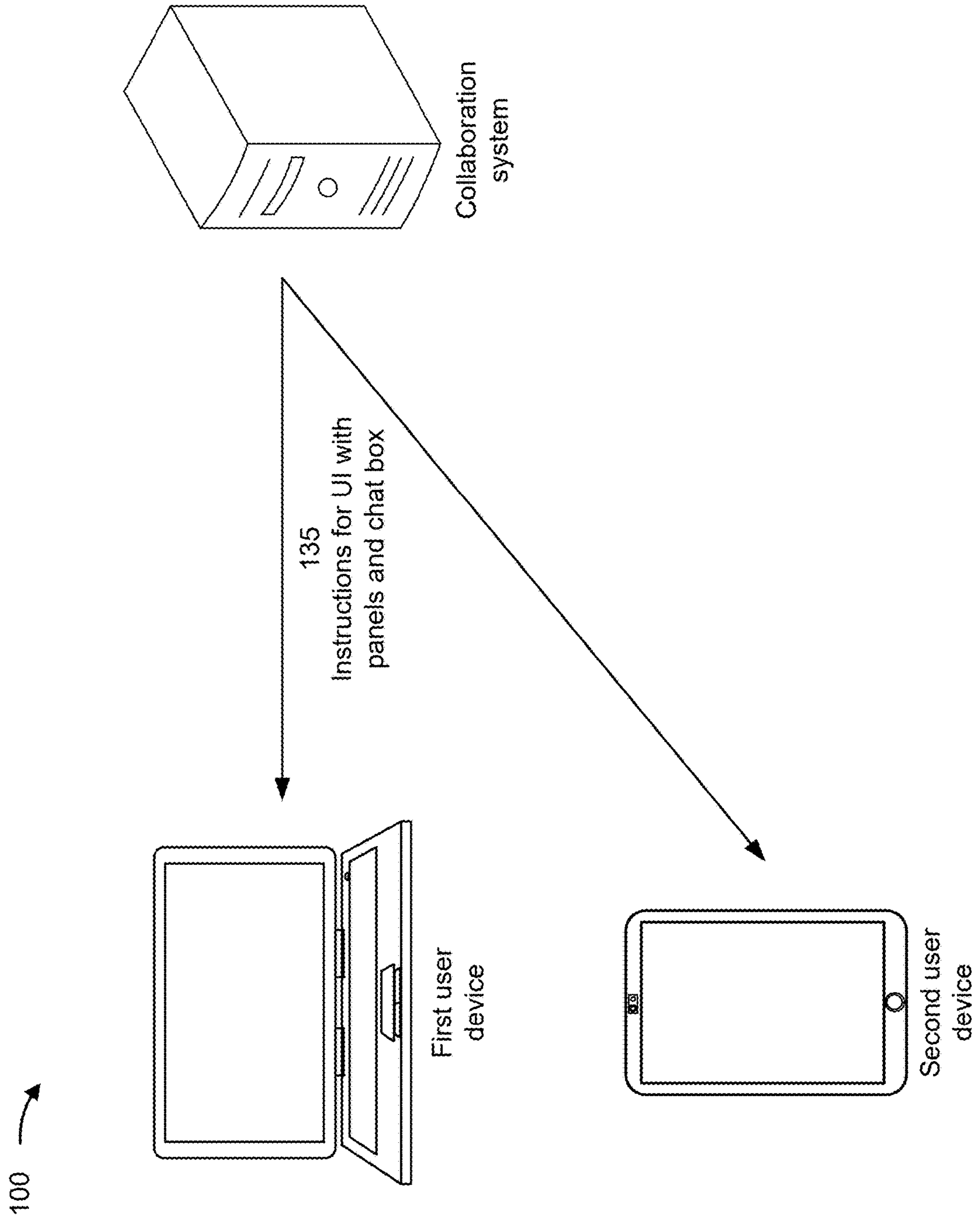

As shown in FIG. 1C, the collaboration system may initiate the collaborative session. The collaboration system may render the website in a UI. The collaboration system may render a first copy of the website to be controlled by the first user device and a second copy of the website to be controlled by the second user device. For example, the UI may include a first panel with a first copy of the website controlled by the first user device and a second panel with a second copy of the website controlled by the second user device.

In some implementations, the UI may further include a chat box to be controlled by both the first user device and the second user device. For example, the chat box may be overlaid (e.g., over both panels). Accordingly, the UI may be as described in connection with FIG. 2.

In implementations where the first user device provides the setting, as described above, the collaboration system may render the second copy of the website differently from the first copy. For example, the second copy may omit the portion of the website indicated by the setting (e.g., the favorites list, among other examples).

As shown by reference number 135, the collaboration system may transmit, and the first user device and the second user device may receive, instructions for the UI. For example, the collaboration system may multicast the instructions (e.g., to an IP address associated with the first user device along with an IP address associated with the second user device). Alternatively, the collaboration system may transmit different versions of the instructions to different user devices. For example, the collaboration system may transmit, and the first user device may receive, a first version of the instructions that includes the portion of the website (indicated by the setting provided by the first user device, as described above) in the UI. Additionally, the collaboration system may transmit, and the second user device may receive, a second version of the instructions that omits the portion of the website in the UI. Alternatively, the collaboration system may transmit, and the second user device may receive, a second version of the instructions that obscures (e.g., blurs or redacts, among other examples) the portion of the website in the UI. The first and second user devices may output the UI (e.g., using output components of the first and second user devices) based on the instructions from the collaboration system.

Figure 1D:
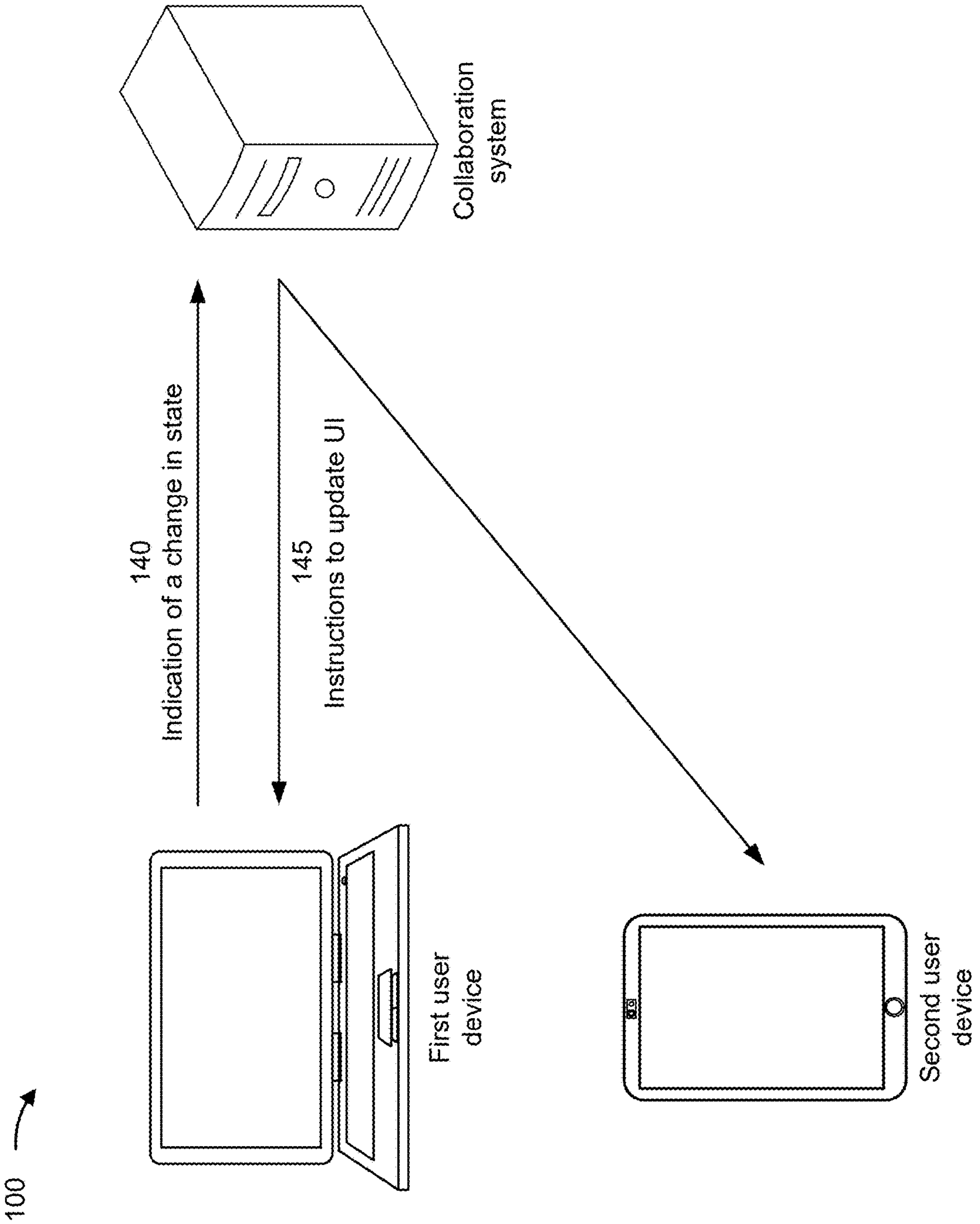

As shown in FIG. 1D, the collaboration system may update the UI at both user devices in response to input from the first user device. As shown by reference number 140, the first user device may transmit, and the collaboration system may receive, an indication of a first change in state associated with the first copy of the website. For example, the first user may scroll a webpage of the website, click a link on the website, interact with an executable element of the website, or otherwise cause the first change in state. In some implementations, the first user device may transmit, and the collaboration system may receive, the indication of the first change in state using a first set of APIs provided for the first user device. For example, the collaboration system may provision a set of REST APIs for the first user device that the first user device may call to inform the collaboration system about changes in state.

As shown by reference number 145, the collaboration system may transmit, and the first user device and the second user device may receive, instructions to update the UI based on the first change in state. Accordingly, a portion of the UI showing the first copy of the website (e.g., the first panel, as described above) may update on both user devices in response to the first user's actions. In one example, the collaboration system may map the first change in state to a representation of the first change and may generate the instructions to update the UI (based on the first change in state) to encapsulate the representation. Additionally, the collaboration system may distribute the instructions to update the UI (based on the first change in state) to both user devices. For example, the collaboration system may distribute the instructions using the first set of APIs provided for the first user device and a second set of APIs provided for the second user device. For example, the collaboration system may provision, to each user device, a respective set of REST APIs that the collaboration system may call to distribute UI updates to that user device.

Figure 1E:
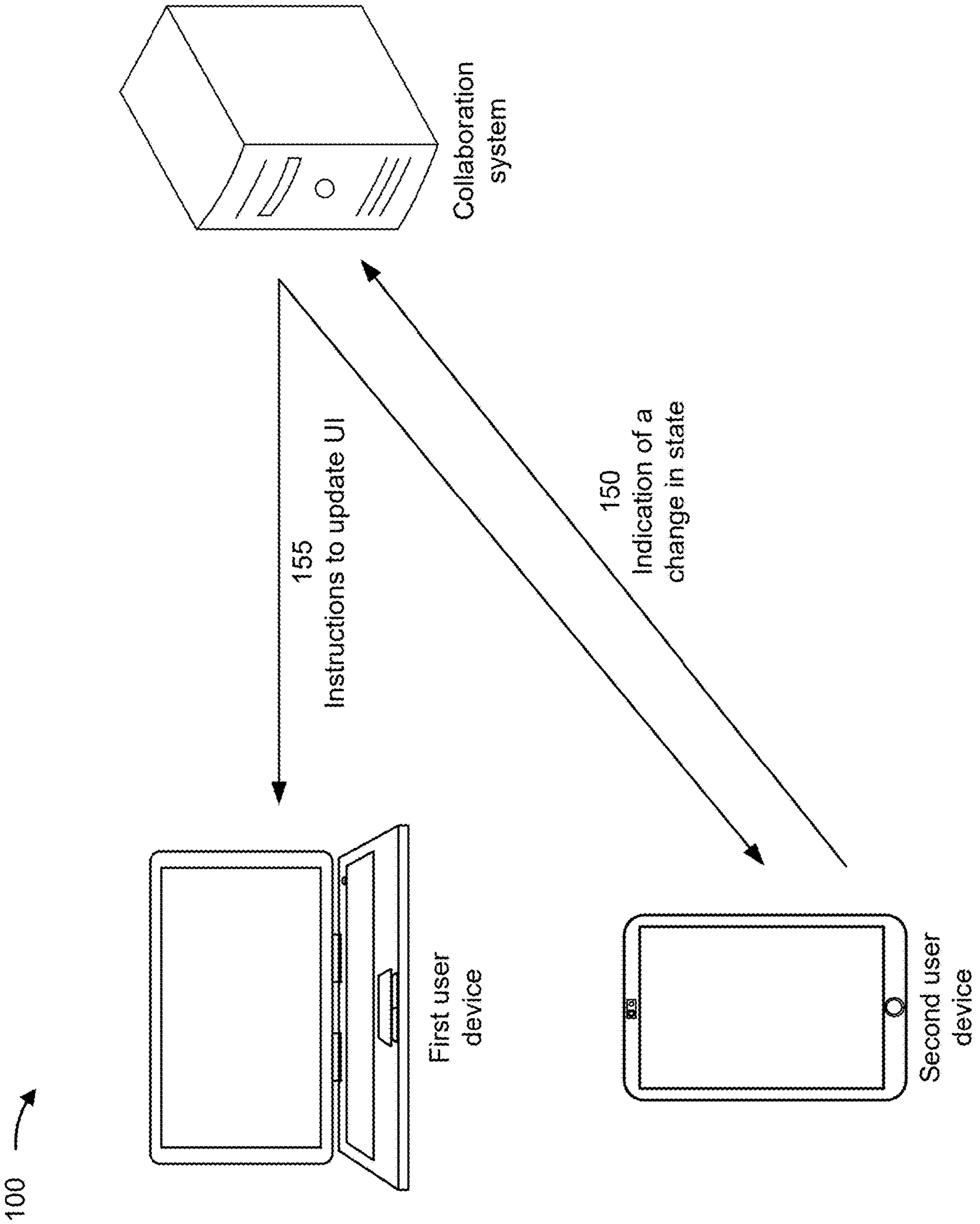

Additionally, as shown in FIG. 1E, the collaboration system may update the UI at both user devices in response to input from the second user device. As shown by reference number 150, the second user device may transmit, and the collaboration system may receive, an indication of a second change in state associated with the second copy of the website. For example, the second user may scroll a webpage of the website, click a link on the website, interact with an executable element of the website, or otherwise cause the second change in state. In some implementations, the second user device may transmit, and the collaboration system may receive, the indication of the second change in state using the second set of APIs provided for the second user device. For example, the collaboration system may provision a set of REST APIs for the second user device that the second user device may call to inform the collaboration system about changes in state.

As shown by reference number 155, the collaboration system may transmit, and the first user device and the second user device may receive, instructions to update the UI based on the second change in state. Accordingly, a portion of the UI showing the second copy of the website (e.g., the second panel, as described above) may update on both user devices in response to the second user's actions. In one example, the collaboration system may map the second change in state to a representation of the second change and may generate the instructions to update the UI (based on the second change in state) to encapsulate the representation. Additionally, the collaboration system may distribute the instructions to update the UI (based on the second change in state) to both user devices. For example, the collaboration system may distribute the instructions using the first set of APIs provided for the first user device and the second set of APIs provided for the second user device. For example, the collaboration system may provision, to each user device, a respective set of REST APIs that the collaboration system may call to distribute UI updates to that user device.

Figure 1F:
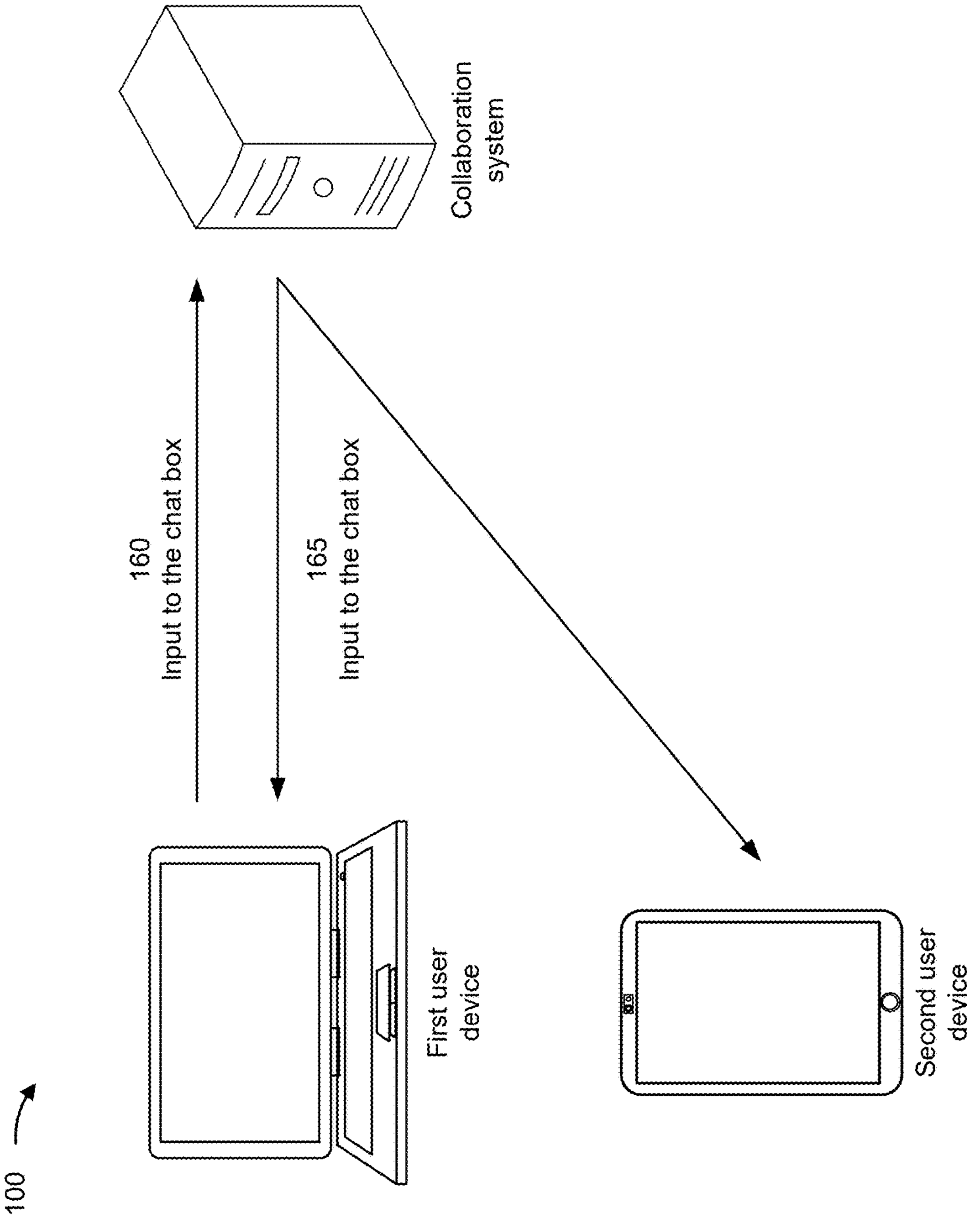

As shown in FIG. 1F, the collaboration system may update the chat box at both user devices in response to input from the first user device. As shown by reference number 160, the first user device may transmit, and the collaboration system may receive, first input into the chat box. For example, the first user may submit a text message (e.g., using a text box and/or a button of the chat box). In some implementations, the first user device may transmit, and the collaboration system may receive, the first input using the first set of APIs provided for the first user device.

As shown by reference number 165, the collaboration system may transmit, and the first user device and the second user device may receive, the first input for display in the chat box. Accordingly, the chat box may update on both user devices in response to the first user's actions. In one example, the collaboration system may distribute the first input for display in the chat box using the first set of APIs provided for the first user device and the second set of APIs provided for the second user device.

Figure 1G:
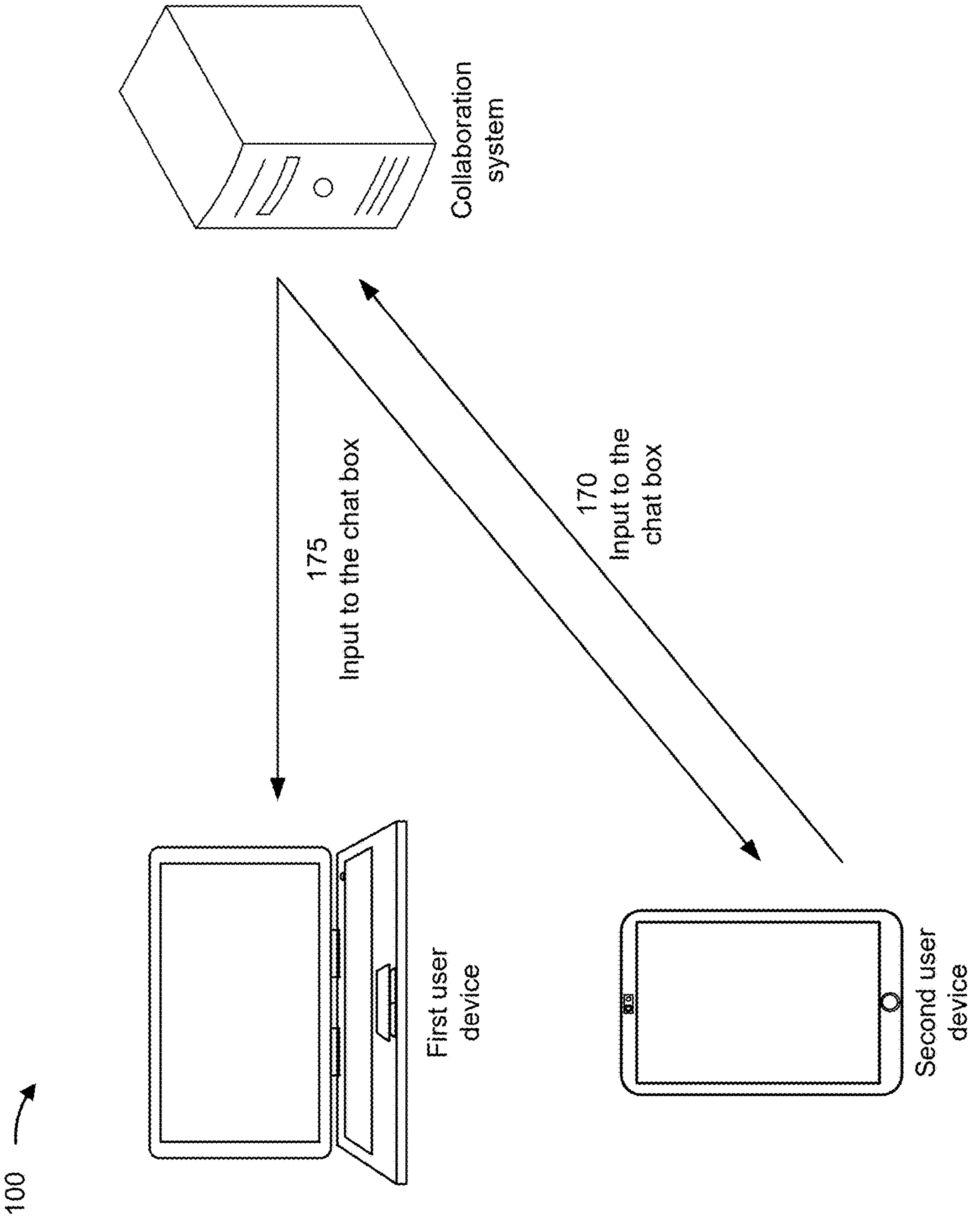

Additionally, as shown in FIG. 1G, the collaboration system may update the chat box at both user devices in response to input from the second user device. As shown by reference number 170, the second user device may transmit, and the collaboration system may receive, second input into the chat box. For example, the second user may submit a text message (e.g., using a text box and/or a button of the chat box). In some implementations, the second user device may transmit, and the collaboration system may receive, the second input using the second set of APIs provided for the second user device.

As shown by reference number 175, the collaboration system may transmit, and the first user device and the second user device may receive, the second input for display in the chat box. Accordingly, the chat box may update on both user devices in response to the second user's actions. In one example, the collaboration system may distribute the second input for display in the chat box using the first set of APIs provided for the first user device and the second set of APIs provided for the second user device.

Figure 2:
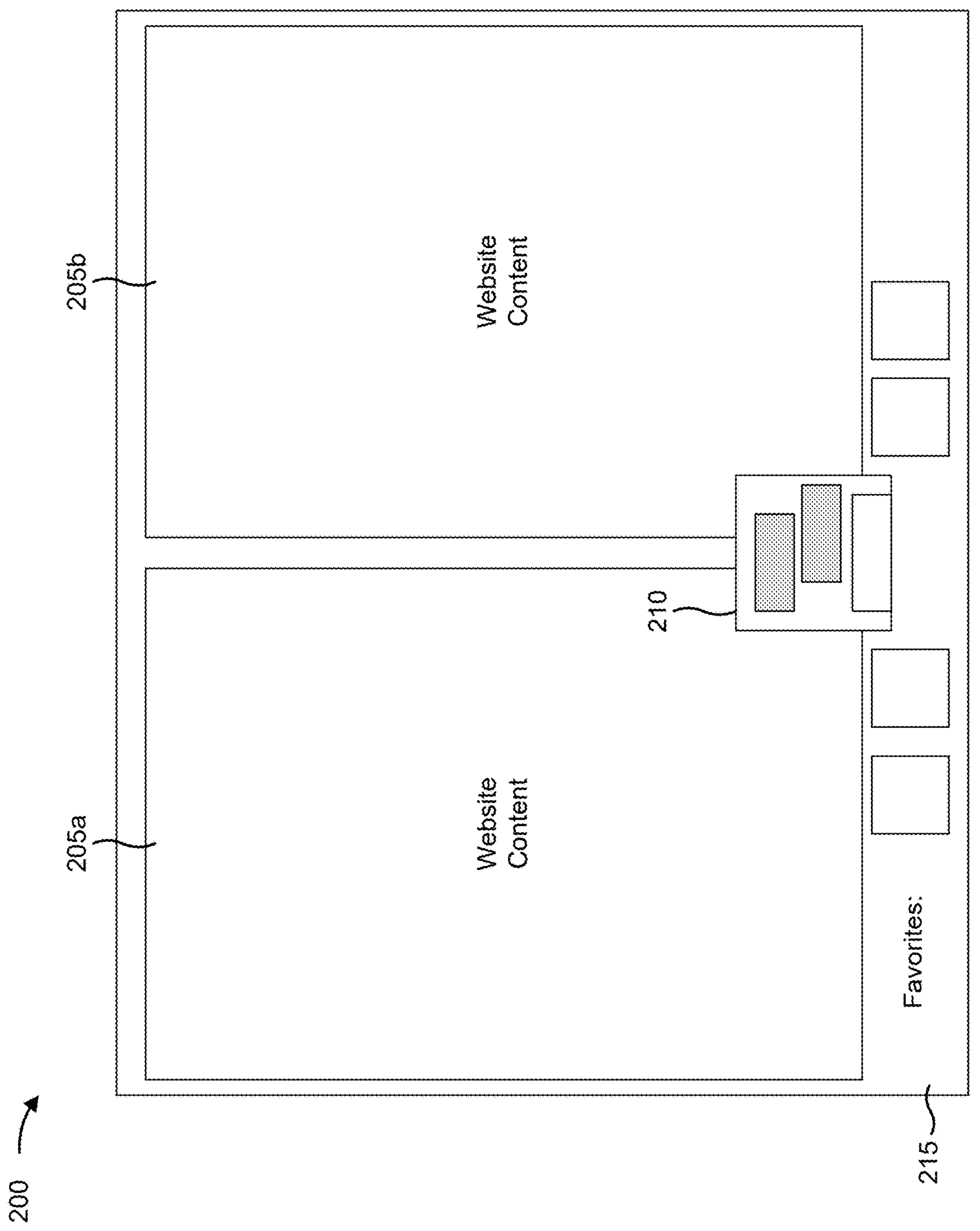
FIG. 2 is a diagram of example UI associated with collaborative website browsing, in accordance with some embodiments of the present disclosure.

Although the example 100 is described in connection with the chat box, other examples may include additional or alternative overlaid elements. For example, as depicted in FIG. 2, a favorites list may be overlaid and controlled by both user devices.

In some implementations, the collaboration system may train a machine learning model using the collaborative session. For example, the collaboration system may provide the first change in state, the second change in state, the first input, and/or the second input to a machine learning host for training the machine learning model. The machine learning host may include one or more devices capable of receiving, generating, storing, processing, providing, and/or routing information associated with the machine learning model. The machine learning host may include a communication device and/or a computing device, such as a server, such as an application server, a client server, a web server, a database server, a host server, a proxy server, a virtual server (e.g., executing on computing hardware), or a server in a cloud computing system. Additionally, or alternatively, the machine learning host may include computing hardware used in a cloud computing environment. The machine learning host may use the machine learning model to identify which messages (e.g., from the chat box) and/or portions of the website were associated with the first user making a decision (e.g., determining to buy a vehicle or determining to pass on a vehicle). Accordingly, the machine learning model may identify which factors were most relevant to the first user with respect to the decision (e.g., as inferred from relevant messages and/or portions of the website).

In some implementations, the first user device may terminate the collaborative session without leaving the website. For example, the first user device may transmit, and the collaboration system may receive, a request to transition to individual mode. The request may be an HTML request, an FTP request, and/or an API call. In one example, the first user associated with the first user device may provide input (e.g., via an input component of the first user device) that triggers the first user device to transmit the request. In some implementations, the first user may interact with a UI to provide the input. For example, the UI may include a control panel associated with the collaborative session (in addition to the copies of the websites and any overlaid elements), and the first user may interact with an element of the control panel to trigger the first user device to transmit the request. Therefore, the collaboration system may transmit, and the first user device may receive, instructions for a new UI that includes the first copy of the website controlled by the first user device, without the second copy of the website. The new UI may include the chat box (e.g., with any previous inputs from either user device) or may exclude the chat box. In some implementations, the collaboration system may further transmit the instructions for the new UI to the second user device. Accordingly, the second user may be switched to a "view only" mode rather than having any elements controllable by the second user device. Alternatively, the collaboration system may further transmit a message to the second user device indicating termination of the collaborative session. Accordingly, the second user may be removed from the website altogether.

Although the example 100 is described in connection with two users, other examples may include more than two users. For example, the first user device may invite two or more users to join the collaborative session (e.g., using separate user devices). Therefore, the UI may include three or more copies of the website. Additionally, different users may be associated with different permissions. For example, the first user device may indicate that the second user is not allowed to view the favorites list but a third user is allowed. In another example, the first user device may indicate that the second user is allowed to use the chat box but a third user is not allowed. Other examples may include different elements that are omitted, obscured, or unusable (even though the elements are shown).

By using techniques as described in connection with FIGS. 1A-1G, the collaboration system updates the UI as each user navigates through that user's copy of the website. As a result, the collaboration system enables collaboration on the website with significantly fewer computing resources than videoconference software.

As indicated above, FIGS. 1A-1G are provided as an example. Other examples may differ from what is described with regard to FIGS. 1A-1G.

FIG. 2 is a diagram of example UI 200 associated with collaborative website browsing. The example UI 200 may be output by a user device (e.g., using an output component of the user device) based on instructions from a collaboration system. These devices are described in more detail in connection with FIGS. 3 and 4.

As shown in FIG. 2, the example UI 200 may include a first panel 205*a* that includes a first copy of a website. The first copy may be rendered based on instructions from a web host and may be controllable by a first user device. Accordingly, the first copy may be viewable, but not controllable, by a second user device. The example UI 200 may further include a second panel 205*b* that includes a second copy of the website. The second copy may be rendered based on instructions from the web host and may be controllable by the second user device. Accordingly, the second copy may be viewable, but not controllable, by the first user device.

As further shown in FIG. 2, the example UI 200 may include one or more overlaid elements. The example UI 200 may include, for example, a chat box 210 overlaid between (and partially over) the panels 205*a* and 205*b*. The chat box 210 may be jointly controllable by the first user device and the second user device. The example UI 200 may also include, for example, a favorites list 215 overlaid underneath the panels 205*a* and 205*b*. The favorites list 215 may be controllable by the first user device and viewable (but not controllable) by the second user device.

The elements in FIG. 2 may be further customized. For example, portions of the first panel 205*a* and/or the second panel 205*b* may be omitted and/or obscured for the second user device (e.g., based on a setting from the first user device). Additionally, or alternatively, the chat box 210 may be viewable (but not controllable), or may be hidden, from the second user device. Additionally, or alternatively, the favorites list 215 may be controllable by, or may be hidden from, the second user device.

As indicated above, FIG. 2 is provided as an example. Other examples may differ from what is described with regard to FIG. 2. For example, additional users may be included in a collaborative session, and thus additional panels may be included.

Figure 3:
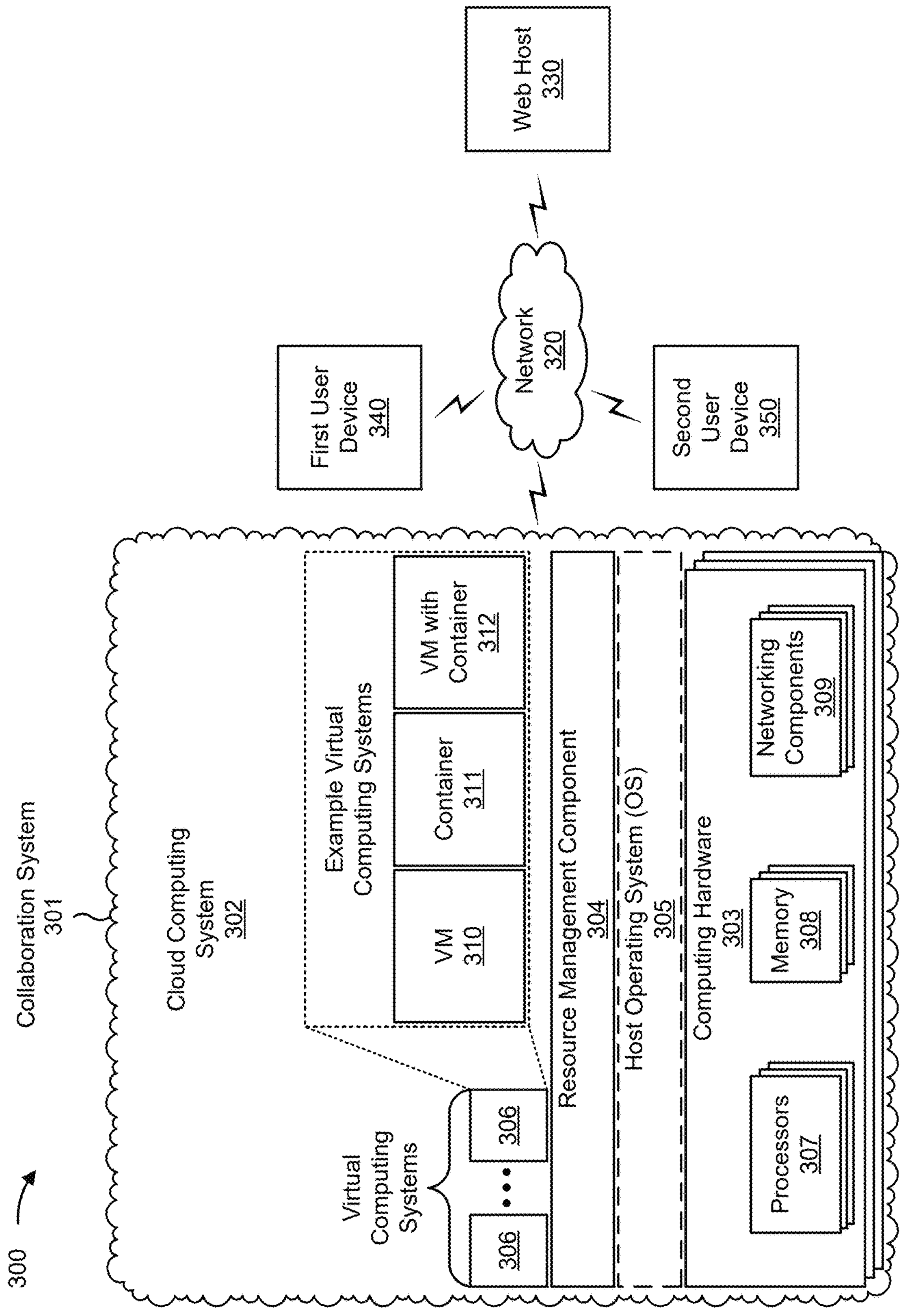
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a collaboration system 301, which may include one or more elements of and/or may execute within a cloud computing system 302. The cloud computing system 302 may include one or more elements 303-312, as described in more detail below. As further shown in FIG. 3, environment 300 may include a network 320, a web host 330, a first user device 340, and/or a second user device 350. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein. The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the collaboration system 301 may include one or more elements 303-312 of the cloud computing system 302, may execute within the cloud computing system 302, and/or may be hosted within the cloud computing system 302, in some implementations, the collaboration system 301 may not be cloud-based (e.g., may be implemented outside of a cloud computing system) or may be partially cloud-based. For example, the collaboration system 301 may include one or more devices that are not part of the cloud computing system 302, such as device 400 of FIG. 4, which may include a standalone server or another type of computing device. The collaboration system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The web host 330 may include one or more devices capable of receiving, generating, storing, processing, and/or providing information associated with a website, as described elsewhere herein. The web host 330 may include a communication device and/or a computing device. For example, the web host 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The web host 330 may communicate with one or more other devices of environment 300, as described elsewhere herein.

The first user device 340 may include one or more devices capable of receiving, generating, storing, processing, and/or providing information associated with a collaborative session, as described elsewhere herein. The first user device 340 may include a communication device and/or a computing device. For example, the first user device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The first user device 340 may communicate with one or more other devices of environment 300, as described elsewhere herein.

The second user device 350 may include one or more devices capable of receiving, generating, storing, processing, and/or providing information associated with a collaborative session, as described elsewhere herein. The second user device 350 may include a communication device and/or a computing device. For example, the second user device 350 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The second user device 350 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
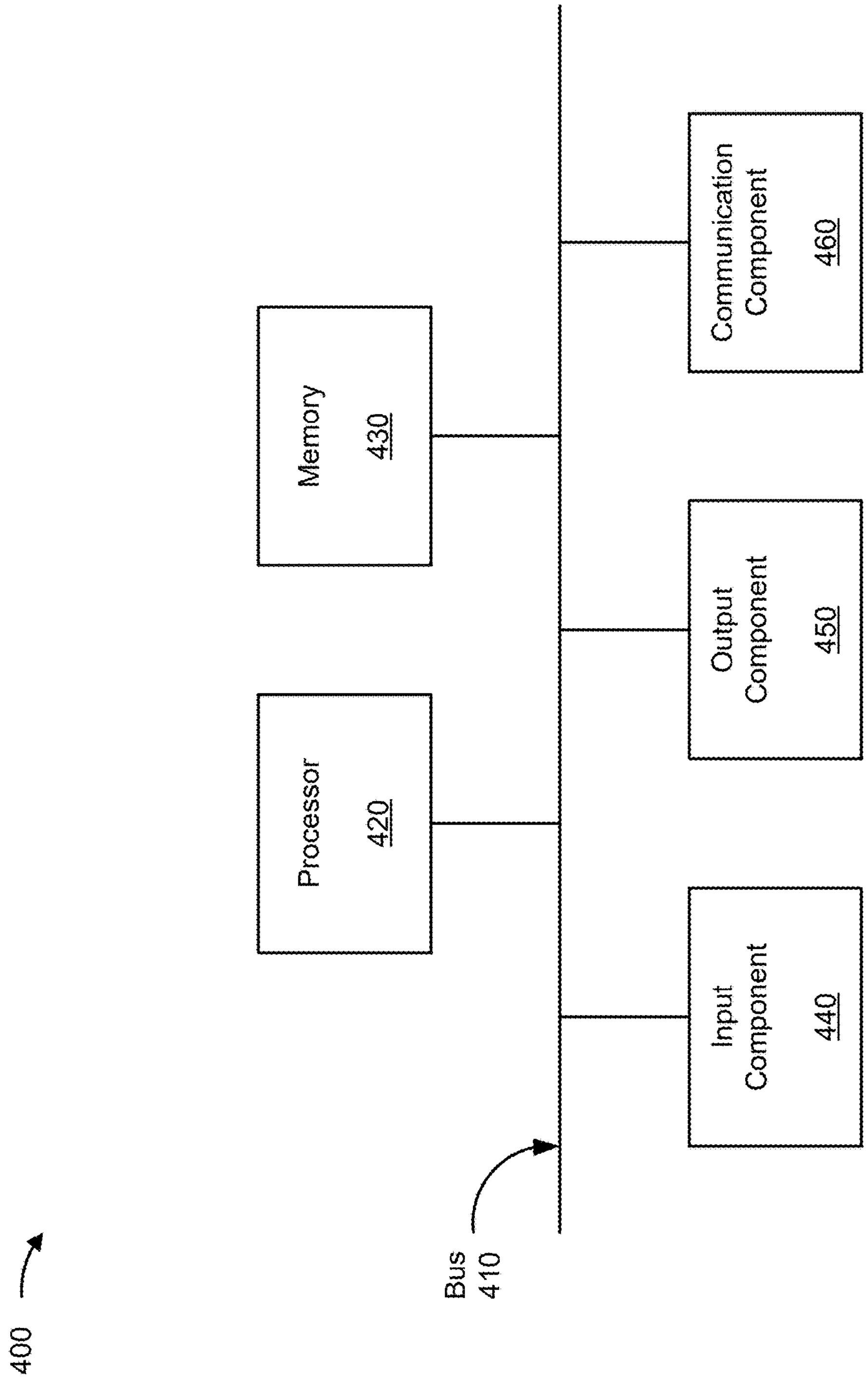
FIG. 4 is a diagram of example components of one or more devices of FIG. 3, in accordance with some embodiments of the present disclosure.

FIG. 4 is a diagram of example components of a device 400 associated with collaborative website browsing. The device 400 may correspond to a web host 330, a first user device 340, and/or a second user device 350. In some implementations, a web host 330, a first user device 340, and/or a second user device 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
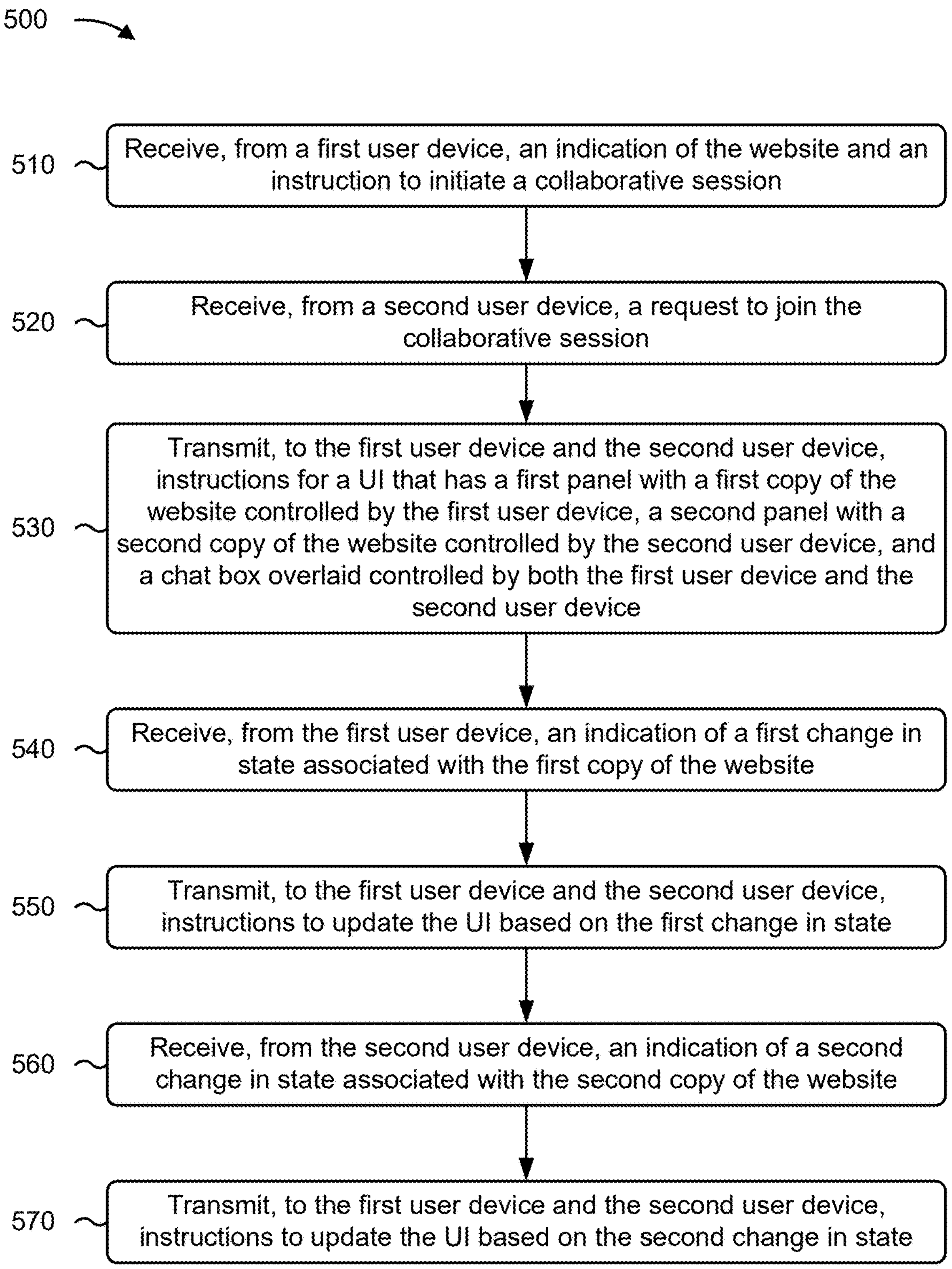
FIG. 5 is a flowchart of an example process relating to collaborative website browsing, in accordance with some embodiments of the present disclosure.

FIG. 5 is a flowchart of an example process 500 associated with collaborative website browsing. In some implementations, one or more process blocks of FIG. 5 may be performed by a collaboration system 301. In some implementations, one or more process blocks of FIG. 5 may be performed by another device or a group of devices separate from or including the collaboration system 301, such as a web host 330, a first user device 340, and/or a second user device 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, from a first user device, an indication of the website and an instruction to initiate a collaborative session (block 510). For example, the collaboration system 301 (e.g., using processor 420, memory 430, and/or communication component 460) may receive, from a first user device, an indication of the website and an instruction to initiate a collaborative session, as described above in connection with reference number 105 of FIG. 1A. As an example, the instruction may include an HTTP message, an FTP message, and/or an API call, among other examples. The indication may include a web address associated with the website, an IP address associated with the website, a machine name of a web host for the website, and/or a MAC address associated with the web host for the website.

As further shown in FIG. 5, process 500 may include receiving, from a second user device, a request to join the collaborative session (block 520). For example, the collaboration system 301 (e.g., using processor 420, memory 430, and/or communication component 460) may receive, from a second user device, a request to join the collaborative session, as described above in connection with reference number 130 of FIG. 1C. As an example, the request may include an HTTP request, an FTP request, and/or an API call, among other examples.

As further shown in FIG. 5, process 500 may include transmitting, to the first user device and the second user device, instructions for a UI that has a first panel with a first copy of the website controlled by the first user device, a second panel with a second copy of the website controlled by the second user device, and a chat box overlayed controlled by both the first user device and the second user device (block 530). For example, the collaboration system 301 (e.g., using processor 420, memory 430, and/or communication component 460) may transmit, to the first user device and the second user device, instructions for a UI that has a first panel with a first copy of the website controlled by the first user device, a second panel with a second copy of the website controlled by the second user device, and a chat box overlayed controlled by both the first user device and the second user device, as described above in connection with reference number 135 of FIG. 1C. As an example, the UI may be as described in connection with FIG. 2.

As further shown in FIG. 5, process 500 may include receiving, from the first user device, an indication of a first change in state associated with the first copy of the website (block 540). For example, the collaboration system 301 (e.g., using processor 420, memory 430, and/or communication component 460) may receive, from the first user device, an indication of a first change in state associated with the first copy of the website, as described above in connection with reference number 140 of FIG. 1D. As an example, a first user of the first user device may scroll a webpage of the website, click a link on the website, interact with an executable element of the website, or otherwise cause the first change in state. In some implementations, the collaboration system 301 may receive the indication of the first change using a first set of APIs provided for the first user device.

As further shown in FIG. 5, process 500 may include transmitting, to the first user device and the second user device, instructions to update the UI based on the first change in state (block 550). For example, the collaboration system 301 (e.g., using processor 420, memory 430, and/or communication component 460) may transmit, to the first user device and the second user device, instructions to update the UI based on the first change in state, as described above in connection with reference number 145 of FIG. 1D. As an example, a portion of the UI showing the first copy of the website (e.g., the first panel, as described above) may update on both user devices in response to the first change in state.

As further shown in FIG. 5, process 500 may include receiving, from the second user device, an indication of a second change in state associated with the second copy of the website (block 560). For example, the collaboration system 301 (e.g., using processor 420, memory 430, and/or communication component 460) may receive, from the second user device, an indication of a second change in state associated with the second copy of the website, as described above in connection with reference number 150 of FIG. 1E. As an example, a second user of the second user device may scroll a webpage of the website, click a link on the website, interact with an executable element of the website, or otherwise cause the second change in state. In some implementations, the collaboration system 301 may receive the indication of the second change using a second set of APIs provided for the second user device.

As further shown in FIG. 5, process 500 may include transmitting, to the first user device and the second user device, instructions to update the UI based on the second change in state (block 570). For example, the collaboration system 301 (e.g., using processor 420, memory 430, and/or communication component 460) may transmit, to the first user device and the second user device, instructions to update the UI based on the second change in state, as described above in connection with reference number 155 of FIG. 1E. As an example, a portion of the UI showing the second copy of the website (e.g., the second panel, as described above) may update on both user devices in response to the second change in state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1G and/or FIG. 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for facilitating collaboration on a website, the system comprising:

one or more memories; and one or more processors, communicatively coupled to the one or more memories, configured to:

receive, from a first user device, an indication of the website and an instruction to initiate a collaborative session;

receive, from a second user device, a request to join the collaborative session;

transmit, to the first user device and the second user device, instructions for a user interface (UI), wherein the UI has a first panel with a first copy of the website controlled by the first user device, a second panel with a second copy of the website controlled by the second user device, and a chat box overlaid controlled by both the first user device and the second user device;

receive, from the first user device, an indication of a first change in state associated with the first copy of the website;

transmit, to the first user device and the second user device, instructions to update the UI based on the first change in state;

receive, from the second user device, an indication of a second change in state associated with the second copy of the website;

transmit, to the first user device and the second user device, instructions to update the UI based on the second change in state;

receive, from the first user device, first input into the chat box;

transmit, to the first user device and the second user device, the first input for display in the chat box;

receive, from the second user device, second input into the chat box; and transmit, to the first user device and the second user device, the second input for display in the chat box.

2. The system of claim 1, wherein the one or more processors are configured to:

provide the first change in state, the second change in state, the first input, and the second input to a machine learning host for training a machine learning model.

3. The system of claim 1, wherein the one or more processors, to receive the indication of the first change in state, are configured to:

receive the indication of the first change in state using a first set of application programming interfaces (APIs) provided for the first user device.

4. The system of claim 3, wherein the one or more processors, to transmit the instructions to update the UI based on the first change in state, are configured to:

map the first change in state to a representation of the first change, wherein the representation is encapsulated in the instructions to update the UI based on the first change in state; and distribute the instructions to update the UI based on the first change in state using the first set of APIs provided for the first user device and a second set of APIs provided for the second user device.

5. The system of claim 1, wherein the one or more processors, to receive the indication of the second change in state, are configured to:

receive the indication of the second change in state using a first set of application programming interfaces (APIs) provided for the second user device.

6. The system of claim 5, wherein the one or more processors, to transmit the instructions to update the UI based on the second change in state, are configured to:

map the second change in state to a representation of the second change, wherein the representation is encapsulated in the instructions to update the UI based on the second change in state; and distribute the instructions to update the UI based on the second change in state using the first set of APIs provided for the second user device and a second set of APIs provided for the first user device.

7. The system of claim 1, wherein the one or more processors are configured to:

transmit a hyperlink, to the first user device, associated with joining the collaborative session.

8. The system of claim 1, wherein the one or more processors are configured to:

receive, from the first user device, a request to transition to individual mode; and transmit, to the first user device and the second user device, and in response to the request, instructions for a new UI, wherein the new UI includes the first copy of the website controlled by the first user device, without the second copy of the website, and the chat box.

9. A method of facilitating collaboration on a website, comprising:

receiving, at a collaboration system and from a first user device, an indication of the website and an instruction to initiate a collaborative session;

receiving, at the collaboration system and from a second user device, a request to join the collaborative session;

transmitting, to the first user device and the second user device, instructions for a user interface (UI), wherein the UI has a first panel with a first copy of the website controlled by the first user device, a second panel with a second copy of the website controlled by the second user device, and a chat box overlayed controlled by both the first user device and the second user device;

receiving, at the collaboration system and from the first user device, an indication of a first change in state associated with the first copy of the website;

transmitting, to the first user device and the second user device, instructions to update the UI based on the first change in state;

receiving, at the collaboration system and from the second user device, an indication of a second change in state associated with the second copy of the website; and transmitting, to the first user device and the second user device, instructions to update the UI based on the second change in state.

10. The method of claim 9, further comprising:

receiving, at the collaboration system and from the first user device, an instruction to disallow collaborators access to a portion of the website, wherein the second copy of the website omits the portion of the website.

11. The method of claim 10, wherein transmitting the instructions for the UI comprises:

transmitting, from the collaboration system and to the first user device, a first version of the instructions that includes the portion of the website in the UI; and transmitting, from the collaboration system and to the second user device, a second version of the instructions that omits the portion of the website in the UI.

12. The method of claim 10, wherein transmitting the instructions for the UI comprises:

transmitting, from the collaboration system and to the first user device, a first version of the instructions that includes the portion of the website in the UI; and transmitting, from the collaboration system and to the second user device, a second version of the instructions that obscures the portion of the website in the UI.

13. The method of claim 10, wherein the portion of the website comprises a favorites list.

14. The method of claim 9, further comprising:

receiving, at the collaboration system and from the first user device, a request to transition to individual mode; and transmitting, to the first user device and the second user device, and in response to the request, instructions for a new UI, wherein the new UI includes the first copy of the website controlled by the first user device, without the second copy of the website, and the chat box.

15. A non-transitory computer-readable medium storing a set of instructions for facilitating collaboration on a website, the set of instructions comprising:

one or more instructions that, when executed by one or more processors of a device, cause the device to:

transmit, to a collaboration system, an indication of the website and an instruction to initiate a collaborative session;

transmit, to a user device, an invitation to the collaborative session;

receive, from the collaboration system, instructions for a user interface (UI), wherein the UI has a first panel with a first copy of the website controlled by the device, a second panel with a second copy of the website controlled by the user device, and a chat box overlayed controlled by both the device and the user device;

transmit, to the collaboration system, an indication of a first change in state associated with the first copy of the website;

receive, from the collaboration system and in response to the indication of the first change in state, instructions to update the UI based on the first change in state; and receive, from the collaboration system, instructions to update the UI based on a second change in state associated with the user device.

16. The non-transitory computer-readable medium of claim 15, wherein the invitation comprises a link, a quick response code, or a meeting identifier.

17. The non-transitory computer-readable medium of claim 15, wherein the one or more instructions, that cause the device to transmit the invitation, cause the device to:

transmit an email message or a text message encapsulating the invitation.

18. The non-transitory computer-readable medium of claim 15, wherein the indication of the website comprises a web address associated with the website.

19. The non-transitory computer-readable medium of claim 15, wherein the one or more instructions, that cause the device to transmit the indication of the first change in state, cause the device to:

receive, from a user, input that causes the first change in state; and transmit, in response to the input, the indication of the first change in state.

20. The system of claim 1, wherein the first copy of the website is controllable by the first user device and viewable, but not controllable by the second user device, and wherein the second copy of the website is controllable by the second user device and viewable, but not controllable by the first user device.

* * * * *